US012694585B2

(12) United States Patent
Okvist et al.

(10) Patent No.: US 12,694,585 B2
(45) Date of Patent: Jul. 28, 2026

(54) AUGMENTING HUMAN VISION IN LIMITED-VISIBILITY ENVIRONMENTS

(71) Applicant: Telefonaktiebolaget LM Ericsson (publ), Stockholm (SE)

(72) Inventors: Peter Okvist, Lulea (SE); Tommy Arngren, Sunderbyn (SE); Till Burkert, Huddinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 107 days.

(21) Appl. No.: 18/716,056

(22) PCT Filed: Dec. 3, 2021

(86) PCT No.: PCT/EP2021/084160
§ 371 (c)(1),
(2) Date: Jun. 3, 2024

(87) PCT Pub. No.: WO2023/099010
PCT Pub. Date: Jun. 8, 2023

(65) Prior Publication Data
US 2025/0037331 A1 Jan. 30, 2025

(51) Int. Cl.
*G06T 11/23* (2026.01)
*G06T 7/13* (2017.01)

(52) U.S. Cl.
CPC ................ *G06T 11/23* (2026.01); *G06T 7/13* (2017.01); *G06T 2207/10028* (2013.01); *G06T 2207/10048* (2013.01); *G06T 2207/20224* (2013.01)

(58) Field of Classification Search
None
See application file for complete search history.

(56) References Cited

U.S. PATENT DOCUMENTS 10,896,492 B2 1/2021 Long, II et al.
2011/0261207 A1 10/2011 Strandemar
(Continued)

FOREIGN PATENT DOCUMENTS

| EP | 2590138 A1 | 5/2013 |
| EP | 3136339 A1 | 3/2017 |
| JP | 2021-156824 A | 10/2021 |
| WO | 2020251069 A1 | 12/2020 |

OTHER PUBLICATIONS

C-Thru; Smoke Diving Helmet [online], Behance.net, Adobe Inc., [retrieved from the Internet on Dec. 1, 2021], https://www.behance.net/gallery/6579685/C-Thru-Smoke-Diving-Helmet.
(Continued)

*Primary Examiner* — James A Thompson
(74) *Attorney, Agent, or Firm* — FBT Gibbons LLP

(57) ABSTRACT

A Mixed-Reality (MR) device for augmenting human vision in limited-visibility environments (e.g., due to smoke 103) is provided. The MR device comprises a visible-range sensor for capturing a visible-range representation of a real-world scene surrounding the MR device with a range commensurate with human vision, an extended-range sensor for capturing an extended-range representation of the real-world scene with an extended range wider than the range commensurate with human vision, a display, and processing circuitry. The processing circuitry causes the MR device to be operative to generate a visible-range representation of edges of one or more physical objects (104) present in the real-world scene by extracting edges from the visible-range representation captured by the visible-range sensor, generate an extended-range representation of edges of the one or more physical objects (104) by extracting edges from the extended-range representation captured by the extended-range sensor, generate a delta representation of edges of the one or more physical objects (104), comprising edges pres-
(Continued)

ent in the extended-range representation of edges but absent in the visible-range representation of edges (illustrated with thick lines in FIG. 2D), and display the delta representation of edges on the display.

20 Claims, 4 Drawing Sheets

(56) References Cited

U.S. PATENT DOCUMENTS

| | | | |
|---|---|---|---|
| 2013/0113939 A1* | 5/2013 | Strandemar | G06T 11/001 |
| | | | 348/E5.09 |
| 2014/0282220 A1* | 9/2014 | Wantland | G06F 3/011 |
| | | | 715/782 |
| 2015/0269742 A1 | 9/2015 | Bergstrom et al. | |
| 2020/0147418 A1 | 5/2020 | Haciomeroglu et al. | |
| 2020/0349354 A1 | 11/2020 | Cossman et al. | |
| 2021/0059344 A1 | 3/2021 | Ralston et al. | |
| 2022/0166964 A1* | 5/2022 | Lee | G06T 7/521 |
| 2023/0186575 A1* | 6/2023 | Turner | G06T 17/00 |
| | | | 345/419 |
| 2024/0273837 A1* | 8/2024 | Lee | G06T 15/04 |

OTHER PUBLICATIONS

C-Thru, Visual Communication and Navigation for Firefighters, Qwake Technologies Inc., [retrieved from the Internet on Dec. 1, 2021], https://www.qwake.tech.

Wang, Ying et al., Edge Extraction by Merging 3D Point Cloud and 2D Image Data, Associate Institute of Management Cybernetics e V. RWTH Aachen University, 2013, 6 pages, Aachen, Germany.

Kim, Jong-Hwan et al., Firefighting Robot Stereo Infrared Vision and Radar Sensor Fusion for Imaging through Smoke, Fire Technology, 2014 Springer Science + Business Media New York, Jun. 5, 2014, 23 pages, vol. 51, New York, USA.

Jorgensen, Troels Bo, et al., Geometric Edge Description and Classification in Point Cloud Data with Application to 3D Object Recognition, The Maersk Mc-Kinney Moller Institute, University of Southern Denmark, VISAPP 2015—$10^{th}$ International Conference on Computer Vision Theory and Application, 2015, pp. 333-340, Odense, Denmark.

Fritsche, Paul et al., Radar and LiDAR Sensorfusion in Low Visibility Environments, Institute of Systems Engineering—Real Time Systems Group, $13^{th}$ International Conference on Informatics in Control, Automation and Robotics, Leibniz Universitat, 2016, pp. 30-36, Hannover, Germany.

Orlosky, Jason et al., VisMerge: Light Adaptive Vision Augmentation via Spectral and Temporal Fusion of Non-visible Light, 2017 IEEE International Symposium on Mixed and Augmented Reality, Oct. 9, 2017, pp. 22-31, Osaka University.

Towa Hightech Co Ltd—Research Use—Infrared Thermography FLIR C2 Online—Apr. 5, 2016.

Sunny Kamiya_Firefighting, Disaster Prevention and AI_Institute of Scientific Approaches for Fire & Disaster_Aug. 31, 2018.

FLIR Systems. No Excuse for Firefighter Disorientation. Online. Sep. 14, 2020.

JP01 2025-07-22 OA Non Final Office Action.

* cited by examiner

210

220

400

| Capturing visible-range representation | 401 |
| Capturing extended-range representation | 402 |
| Generating visible-range repr. of egdes | 403 |
| Generating extended-range repr. of egdes | 404 |
| Generating delta representation of egdes | 405 |
| Displaying delta representation of edges | 406 |
| Displaying visible-range representation | 407 |

AUGMENTING HUMAN VISION IN LIMITED-VISIBILITY ENVIRONMENTS

CROSS REFERENCE TO RELATED DATA

This application is a national-phase entry under 35 USC § 371 of International Application No. PCT/EP2021/084160, filed Dec. 3, 2021, titled "AUGMENTING HUMAN VISION IN LIMITED-VISIBILITY ENVIRONMENTS," the contents of which are hereby incorporated herein in its entirety.

TECHNICAL FIELD

The invention relates to a Mixed-Reality (MR) device for augmenting human vision in limited-visibility environments, a method of augmenting human vision in limited-visibility environments, a corresponding computer program, a corresponding computer-readable data carrier, and a corresponding data carrier signal.

BACKGROUND

Augmented-Reality (AR) and Mixed-reality (MR) solutions are known which detect real-world objects in the real-world scene, i.e., the physical environment, surrounding a user wearing a Head-Mounted Display (HMD) headset using sensors, such as cameras, Lidar, etc, and displaying such objects as an overlay onto the real-world scene viewed by the user. Such an HMD typically comprises a see-through display through which the user can view the real-world scene, and on which virtual content is displayed such that it is overlaid onto the real-world scene.

As an example, the C-THRU helmet by Qwake Technologies (https://www.qwake.tech/, https://www.behance.net/gallery/6579685/C-Thru-Smoke-Diving-Helmet) has been developed as a tool for firefighters operating in environments of low or limited visibility, e.g., due to dense smoke. The C-THRU helmet uses a thermal optical (infrared) camera for capturing images of the real-world scene surrounding the user in the infrared range, which is less impacted by smoke as compared to the visible range. Therefore, in comparison with human vision which relies on visible light, the infrared camera is able to detect objects at an increased or extended range, which objects would not be visible to the user relying on his/her human vision only, e.g., due to smoke.

The C-THRU helmet relies on image processing of a video or image sequence captured by the infrared camera, and enhancing the edges or contours of objects which are captured in the video (a contour is the edge enclosing an object; if an edge defines an object, it becomes a contour), resulting in a wireframe image of edges. The edges are then overlaid onto the real-world scene which the user views through the see-through display of the C-THRU helmet.

The human vision is generally superior in terms of resolution, wide-range vision, etc, and in most circumstances outperforms digitally captured and displayed content. In situations of limited visibility, like dense smoke, but also dense vapor or darkness, solutions like the C-THRU helmet may advantageously be used for enhancing the human vision, thereby extending the range in which objects become visible to a human user of an AR headset.

However, since visibility may change dynamically, e.g., while the user is moving through a smoky environment, or because smoke itself is not static and its density may change over time, displaying real-world objects as overlaid virtual content irrespective of the actual, current visibility within the Field-of-View (FoV) of the user may lead to situations where the natural (human-vision) view of the real-world by the user is disturbed or hampered. For example, this may be the case if real-world objects which the user in fact can see are displayed as virtual content and overlaid onto the user's (human-vision) view of the real-world scene.

SUMMARY

It is an object of the invention to provide an improved alternative to the above techniques and prior art.

More specifically, it is an object of the invention to provide improved solutions for augmenting human vision in limited-visibility environments.

These and other objects of the invention are achieved by means of different aspects of the invention, as defined by the independent claims. Embodiments of the invention are characterized by the dependent claims.

According to a first aspect of the invention, a Mixed-Reality (MR) device for augmenting human vision in limited-visibility environments is provided. The MR device comprises a visible-range sensor for capturing a visible-range representation of a real-world scene which surrounds the MR device. The visible-range sensor is configured to capture the visible-range representation of the real-world scene with a range which is commensurate with that of human vision. The MR device further comprises an extended-range sensor for capturing an extended-range representation of the real-world scene. The extended-range sensor is configured to capture the extended-range representation of the real-world scene with an extended range which is wider than the range which is commensurate with human vision. The MR device further comprises a display and processing circuitry. The processing circuitry causes the MR device to be operative to generate a visible-range representation of edges of one or more physical objects which are present in the real-world scene. The visible-range representation of edges of the one or more physical objects is generated by extracting edges from the visible-range representation captured by the visible-range sensor. The MR device is further operative to generate an extended-range representation of edges of the one or more physical objects. The extended-range representation of edges of the one or more physical objects is generated by extracting edges from the extended-range representation captured by the extended-range sensor. The MR device is further operative to generate a delta representation of edges of the one or more physical objects. The delta representation of edges comprises edges which are present in the extended-range representation of edges, but are absent in the visible-range representation of edges. The MR device is further operative to display the delta representation of edges on the display.

According to a second aspect of the invention, a method of augmenting human vision in limited-visibility environments is provided. The method is performed by an MR device and comprises capturing a visible-range representation of a real-world scene surrounding the MR device. The visible-range representation of the real-world scene is captured with a range which is commensurate with human vision. The visible-range representation of the real-world scene is captured using a visible-range sensor which is comprised in the MR device. The method further comprises capturing an extended-range representation of the real-world scene. The extended-range representation of the real-world scene is captured with an extended range which is wider than the range which is commensurate with human vision. The extended-range representation of the real-world scene is captured using a an extended-range sensor which is comprised in the MR device. The method further comprises generating a visible-range representation of edges of one or more physical objects which are present in the real-world scene. The visible-range representation of edges of the one or more physical objects is generated by extracting edges from the visible-range representation captured by the visible-range sensor. The method further comprises generating an extended-range representation of edges of the one or more physical objects. The extended-range representation of edges of the one or more physical objects is generated by extracting edges from the extended-range representation captured by the extended-range sensor. The method further comprises generating a delta representation of edges of the one or more physical objects. The delta representation of edges of the one or more physical objects comprises edges which are present in the extended-range representation of edges, but are absent in the visible-range representation of edges. The method further comprises displaying the delta representation of edges on a display which is comprised in the MR device.

According to a third aspect of the invention, a computer program is provided. The computer program comprises instructions which, when the computer program is executed by an MR device causes the MR device to carry out the method according to an embodiment of the second aspect of the invention.

According to a fourth aspect of the invention, a computer-readable data carrier is provided. The computer-readable data carrier has stored thereon the computer program according to the third aspect of the invention.

According to a fifth aspect of the invention, a data carrier signal is provided. The data carrier signal carries the computer program according to the third aspect of the invention.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

In the following, embodiments of the Mixed-Reality (MR) device 100 for augmenting human vision in limited-visibility environments are illustrated with reference to FIG. 1.

The MR device 100 may, e.g., be a hand-held device, such as a mobile phone, a smartphone, a digital camera, or a tablet. Alternatively, the MR device 100 may be a Head-Mounted Device (HMD), similar to what is illustrated in FIG. 1. As yet a further alterative, the MR device 100 may be a helmet-mounted device, i.e., integrated into a helmet, such as a firefighter helmet or rescue-worker helmet, similar to the C-THRU helmet by Qwake Technologies.

In the present context, limited-visibility environments are to be understood as environments, both indoor environments and outdoor environments, where human vision is hampered, e.g., by smoke, vapor (water of gases), or low-lighting conditions, resulting in low or limited visibility for a human operating in such environments, such as firefighters or rescue workers.

Figure 1:
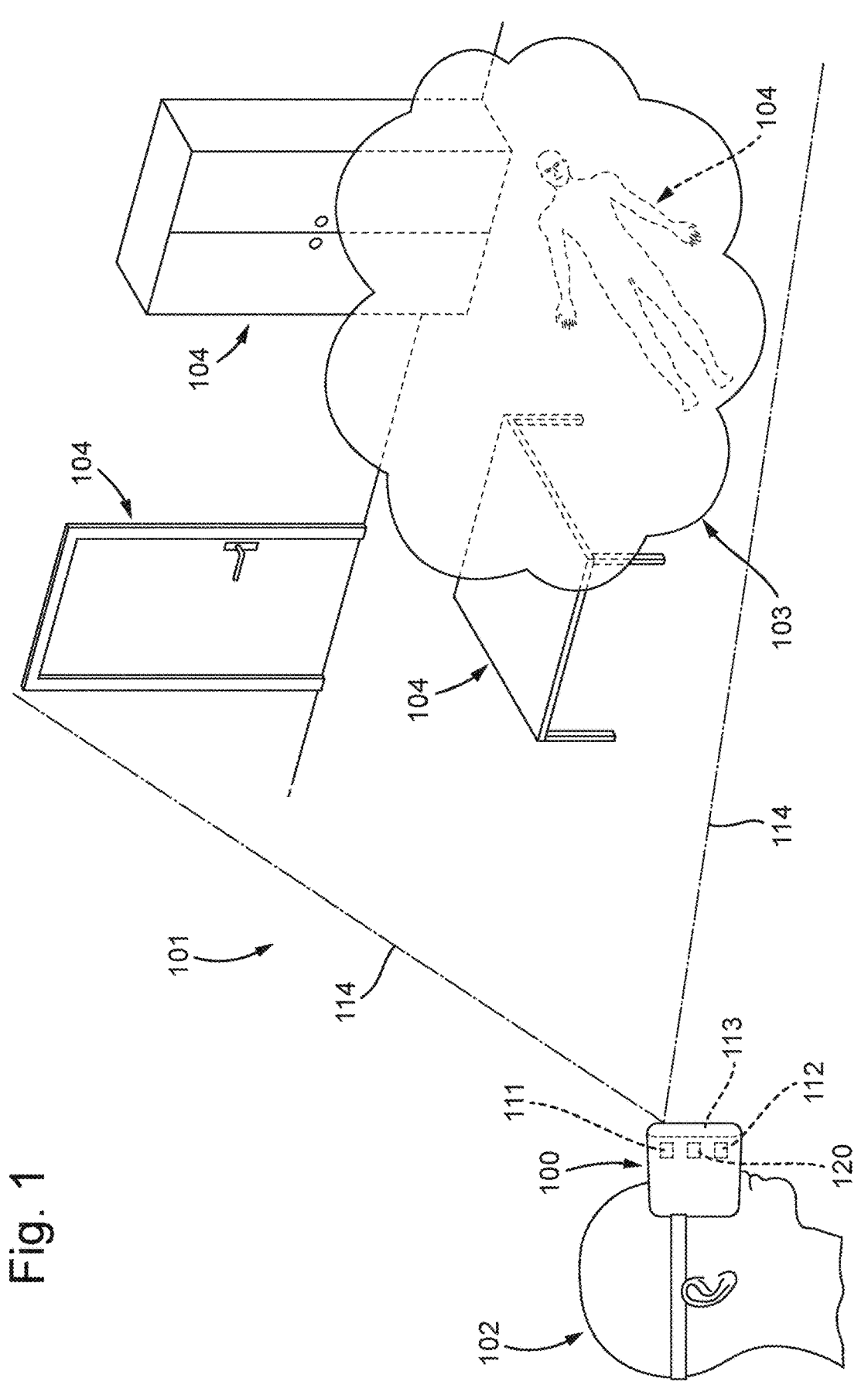
FIG. 1 illustrates the MR device for augmenting human vision in limited-visibility environments, in accordance with embodiments of the invention.
Figure 2A:
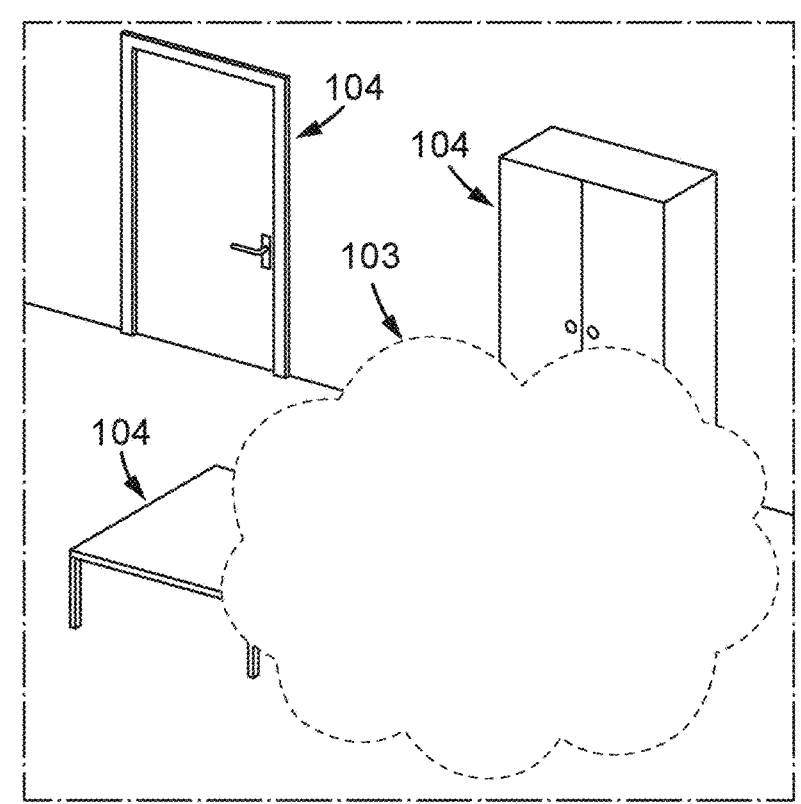
FIG. 2 illustrates visualizations of representations of edges, as well as processed representations, in accordance with embodiments of the invention.
Figure 2B:
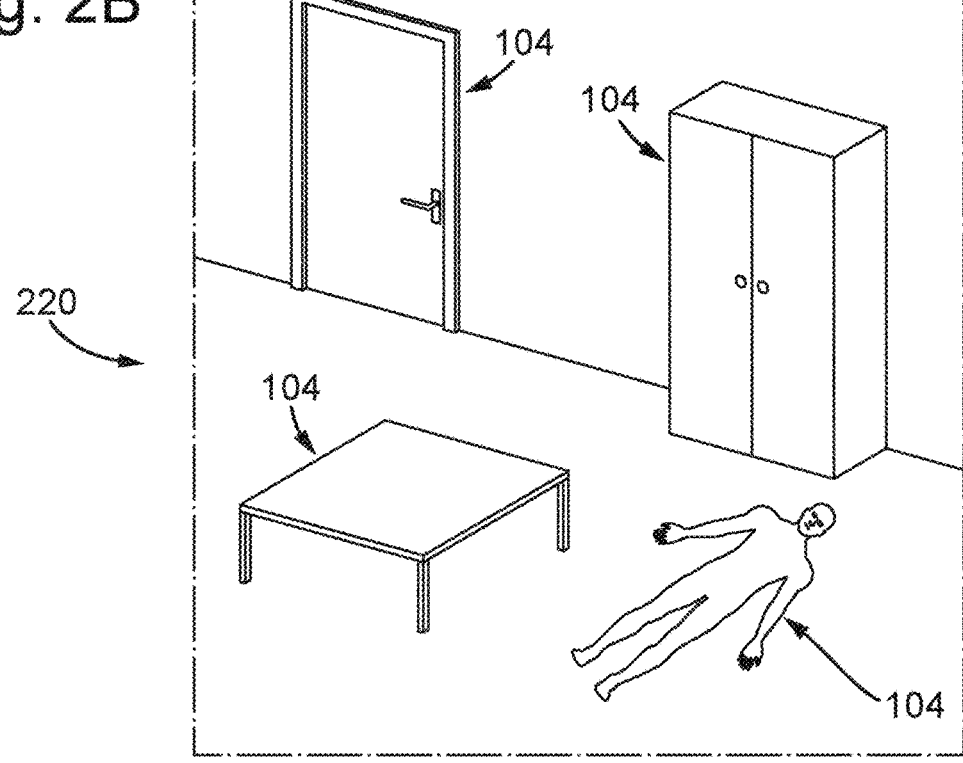
Figure 2C:
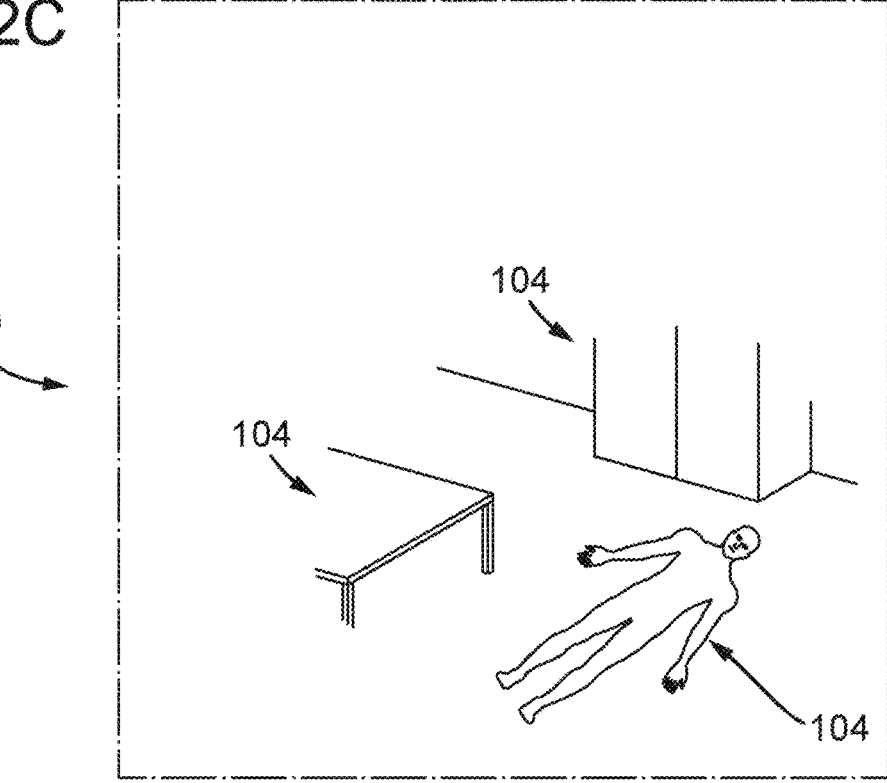
Figure 2D:
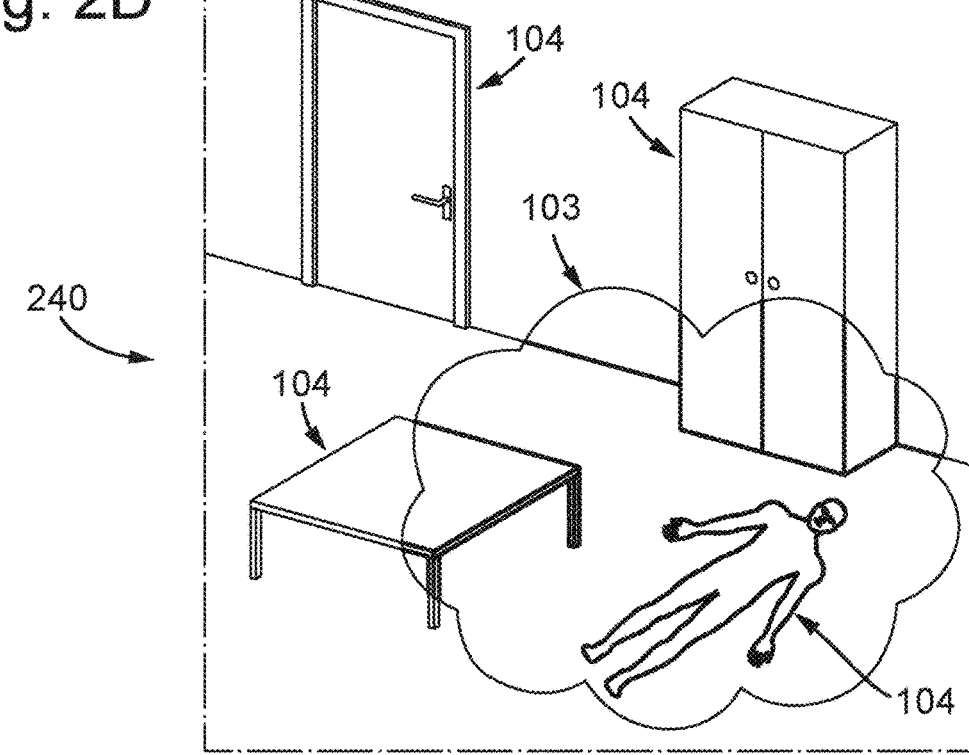

With reference to FIG. 1, the MR device 100 comprises a visible-range sensor 111 for capturing a visible-range representation of a real-world scene 101 surrounding the MR device 100. The real-world scene 101 is an indoor or outdoor location in which a user 102 of the MR device 100 is operating. The visible-range sensor 111 is operative to capture the visible-range representation of the real-world scene 101 with a range which is commensurate with human vision. In other words, the visible-range representation of the real-world scene 101 captured by the visible-range sensor 111 is representative for what the user 102 of the MR device 100 would be able to see relying on his/her human vision. This may, e.g., be achieved by employing a visible-range sensor 111 which is operative to capture the visible-range representation of the real-world scene 101 using wavelengths within the visible range. Typically, the human eye can detect wavelengths ranging from about 380 to about 720 nanometers, aka the visible spectrum. The Field-of-View (FoV) of the visible-range sensor 111 is illustrated as 114 in FIG. 1.

The MR device 100 illustrated in FIG. 1 further comprises an extended-range sensor 112 for capturing an extended-range representation of the real-world scene 101. The extended-range sensor 112 is operative to capture the extended-range representation of the real-world scene 101 with an extended range which is wider, i.e., extending to larger distance from the sensor 112, than the range commensurate with human vision. This may, e.g., be achieved by employing an extended-range sensor 112 which is operative to capture the extended-range representation of the real-world scene 112 using wavelengths which are at least partly outside the visible spectrum. The wavelengths range of the extended-range sensor 112 may be exclusively outside the visible spectrum, i.e., below about 380 nm or above about 720 nm, but may alternatively include at least a portion of the visible range. The wavelength range of the extended-range sensor 112 may extend to wavelengths lower than the visible range, higher than the visible range, or both. For instance, the extended-range sensor 112 may be an infrared-light sensor, such as an infrared-light camera (aka infrared camera, thermal-imaging camera, or simply thermal camera), which typically operate at wavelengths beyond 1000 nm. Using an extended-range sensor 112 operating with infrared light is advantageous in that infrared light is to lesser extent impacted by smoke, as compared to sensors operating in the visible spectrum. For the sake of simplicity, the extended-range sensor 112 is in FIG. 1 illustrated as having the same FoV 114 as the visible-range sensor 111. In practice, different types of sensors typically have different FoVs, and an alignment of the sensors 111 and 112, and or an alignment or transformation of the respective represen-tations captured by the sensors 111 and 112, may be required. For the purpose of describing embodiments of the invention described herein, it is assumed here that the FoV 114 illustrated in FIG. 1 is the FoV which is common to the visible-range sensor 111 and the extended-range sensor 112.

Throughout this disclosure, a representation of the real-world scene 101 is understood to be data captured by a sensor, such as the visible-range sensor 111 or the extended-range sensor 112, or data derived from captured sensor data, and which can be displayed to the user 102, optionally after processing, for visualizing the real-world scene 101 similar to what is exemplified in FIG. 2. For instance, a represen-tation of the real-world scene 101 may be in the form of a digital image, or a sequence of images, i.e., a video. The video may either be based on a two-dimensional (2D) format or three-dimensional (3D) format, e.g., including depth information. As another example, a 3D representation of the real-world scene 101 may be in the form of a point cloud.

The visible-range sensor 111 may, e.g., be a digital camera, operating in the visible spectrum. Correspondingly, the extended-range sensor 112 may, e.g., be a digital camera, operating at wavelengths which are at least partly outside the visible spectrum, such as an infrared camera. In case the visible-/extended-range sensor 111/112 is a digital camera, the corresponding representation of the real-world scene 101 is captured as a video, i.e., a sequence of images. The digital camera 111/112 may either be a monocular camera, opera-tive to capture a 2D representation of the real-world scene 101, or a stereo-camera, operative to capture a 3D repre-sentation of the real-world scene 101.

The extended-range sensor 112 may alternatively be a Lidar or a radar sensor. In this case, the extended-range representation is a 3D representation of the real-world scene 101, e.g., in form of a point cloud. A Lidar sensor is operating at infrared wavelengths, relying on infrared laser beams which are reflected by objects. A radar sensor on the other hand is operating at wavelengths shorter than the visible spectrum, relying on radio waves which are reflected by objects. Both Lidar and radar rely on time-of-flight measurements to determine an object's distance to the sensor.

Further with reference to FIG. 1, the MR device 100 further comprises a display 113. The display 113 is arranged to be viewable by the user 102, and can be used for displaying visual content, including visualizations of repre-sentations of the real-world scene 101 such as exemplified in FIG. 2, to the user 102. The display 113 may, e.g., be a see-through display, as is illustrated in FIG. 1. Typically, this is the case if the MR device 100 is embodied as an HMD or a helmet-mounted device (either mono- or binocular, i.e., the display 113 is arranged to be viewed by one eye or two eyes, respectively). The see-through display 113 enables the user 102 to view the real-world scene 101 directly, relying on his/her human vision. Alternatively, the display 113 may be an opaque, non-see-trough display. Typically, this is the case if the MR device 100 is embodied as a hand-held device, such as a mobile phone, a smartphone, a digital camera, or a tablet.

Figure 3:
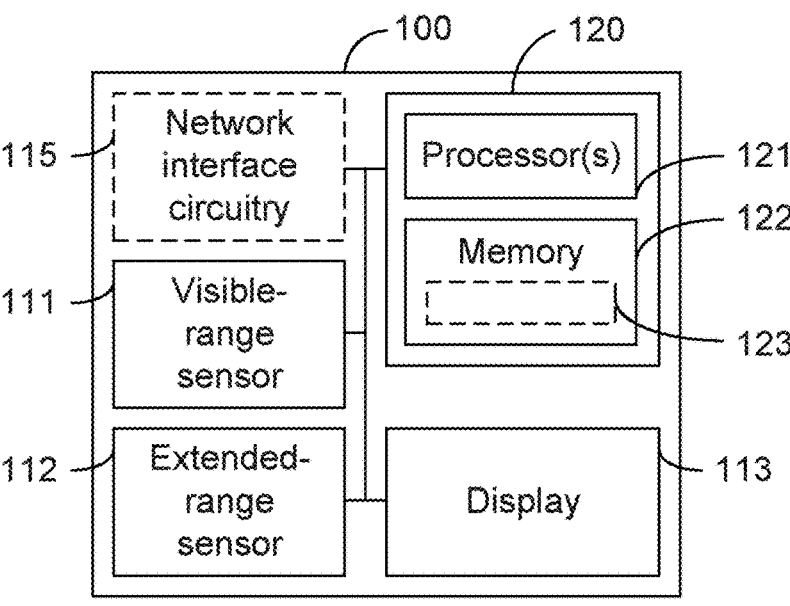
FIG. 3 illustrates an embodiment of the processing circuitry comprised in the MR device for augmenting human vision in limited-visibility environments.

The MR device 100 further comprises a processing cir-cuitry 120, which is described in further detail below with reference to FIG. 3. The processing circuitry 120 causes the MR device 100 to be operative to generate a visible-range representation of edges of one or more physical objects 104 which are present in the real-world scene 101. The visible-range representation of edges of the one or more physical objects 104 may be obtained by extracting edges from the visible-range representation captured by the visible-range sensor 111.

The one or more physical objects 104 may, e.g., be furniture (such as tables, chairs, cupboards, shelfs, etc), walls, windows, doors, stairs, human or animal bodies, debris, vehicles, trees, pipes, etc.

The processing circuitry 120 further causes the MR device 100 to be operative to generate an extended-range representation of edges of the one or more physical objects 104. This may be achieved by extracting edges from the extended-range representation captured by the extended-range sensor 112.

In the present context, an "edge" is a boundary of a real-world object, such as object(s) 104. An edge which is enclosing an object, i.e., defines the object, is commonly referred to as "contour". Throughout this disclosure, "edge" and "contour" are used synonymously. Depending on vis-ibility and capabilities of the visible-range sensor 111 or the extended-range sensor 112, respectively, only a part or parts of an edge may be captured by the sensor. A representation of edges is to be understood as a representation containing edges, or parts thereof, as seen by the sensor 111/112 which has captured the representation of the real-world scene 101 from which of the respective representation of edges is derived.

In FIG. 2, an example visualization 210 of the visible-range representation of edges, which is derived from the visible-range representation of the real-world scene 101 captured by the visible-range sensor 111, is illustrated. As can be seen in the visualization 210, the visible-range sensor 111 captures edges, or parts thereof, of the one or more physical objects 104 which are not obscured by smoke 103. For the sake of simplicity, it is assumed here that the smoke 103 has a well-defined boundary, rather than having a smooth transitional boundary in which visibility gradually diminishes. Also illustrated in FIG. 2 is an example visual-ization 220 of the extended-range representation of edges, which is derived from the extended-range representation of the real-world scene 101 captured by the extended-range sensor 112. As can be seen in the visualization 220, the extended-range sensor 112 captures edges, or parts thereof, of the one or more physical objects 104 to larger extent than what is visible in the visualization 210 of the visible-range representation of edges, and includes edges, or parts thereof, which are not visible in the visualization 210 of the visible-range representation of edges. This is due to the extended range of the sensor 112, as compared to the visible-range sensor 111, owing to the fact that the extended-range sensor 112 is to lesser extent affected by the smoke 103.

Edges may be detected by finding the boundaries of objects within images or other types or captured representations of real-world objects, as is known in the art. For images captured by digital cameras, edges can, e.g., be detected as discontinuities in brightness. A digital image which has been image-processed to the extent that it only represents edges of captured objects is also known as a wireframe image, and has the appearance of a decluttered line drawing. As used herein, the terms "extracting edges" of "detecting edges" are to be understood to include enhancing edges in the captured visible-/extended range representations to the extent that they only contain edges of captured objects.

As an example for generating wireframe images, reference is made to U.S. Pat. No. 10,896,492 B2 which discloses enhancing edges of objects in a thermal image by generating a gradient magnitude image comprising a plurality of pixels having associated gradient magnitude values, partitioning the gradient magnitude image into subregions, calculating gradient magnitude statistics for each subregion, and calculating mapping parameters for each of the subregions that equalize and smooth a dynamic range of the corresponding gradient magnitude statistics across the subregions. The calculated mapping parameters are then applied to pixels in the subregions to generate enhanced gradient magnitude values having equalized luminosity and contrast, resulting in a wireframe image.

Edge detection in 3D point clouds is also known in the art. As an example, "Geometric Edge Description and Classification in Point Cloud Data with Application to 3D Object Recognition" (by T. B. Jorgensen, A. G. Buch, and D. Kraft, in Proceedings of the 10th International Conference on Computer Vision Theory and Applications (VISAPP-2015), pages 333-340, SCITEPRESS, 2015) proposes applying supervised learning techniques to shape descriptors for local point-cloud features, and introduces a shape descriptor for capturing local surface properties near edges.

It is also possible to perform edge detection by merging 2D digital images and 3D point clouds, as is, e.g., described in "Edge Extraction by Merging 3D Point Cloud and 2D Image Data", by Y. Wang, D. Ewert, D. Schilberg, and S. Jeschke, in 2013 10th International Conference and Expo on Emerging Technologies for a Smarter World (CEWIT), pages 1-6, IEEE, 2013. The authors describe a solution based on combining edge data from a point cloud of an object and its corresponding digital images. First, an edge extraction is applied on the 2D image by using the Canny edge detection algorithm. A pixel-data mapping mechanism is proposed for establishing a correspondence between 2D image pixels and 3D point-cloud pixels. By using the established correspondence map, 2D edge data can be merged into the 3D point cloud, where edge extraction is performed.

The processing circuitry 120 further causes the MR device 100 to be operative to generate a delta representation of edges of the one or more physical objects 104. The delta representation of edges comprises edges which are present in the extended-range representation of edges (captured by the extended-range sensor 112, as illustrated in visualization 220) but are absent, i.e., not present, in the visible-range representation of edges (captured by the visible-range sensor 111, as illustrated in visualization 210). In other words, since the visible-range representation of edges contains edges which are visible to the user 102 relying on his/her human vision, and the extended-range representation of edges contains edges which can be captured by the extended-range sensor 112 having a range exceeding the range commensurate with human vision, the delta representation of edges contains edges, or parts thereof, which are not visible to the user 102 when solely relying on his/her human vision. In FIG. 2, an example visualization 230 of the delta representation of edges, corresponding to the difference between the extended-range representation of edges (visualization 220) and the visible-range representation of edges (visualization 210).

The MR device 100 may, e.g., be operative to generate the delta representation of edges of the one or more physical objects 104 by subtracting the visible-range representation of edges from the extended-range representation of edges. If the visible-range representation of edges and the extended-range representation of edges are digital images, the respective images may be subtracted, as is known in the art of image processing. Depending on the alignment and/or calibration of the visible-range sensor 111 and the extended-range sensor 112, the two images may need to be aligned prior to performing image subtraction, so as to minimize any mismatch in sensor alignment. This may, e.g., be performed based on edges contained in both images, which typically the edges which are contained in the visible-range representation. If the visible-range representation of edges and the extended-range representation of edges are point clouds, the delta representation of edges of the one or more physical objects 104 is generated by subtracting of the respective point clouds.

The processing circuitry 120 further causes the MR device 100 to be operative to display the delta representation of edges on the display 113. If the display 113 is a see-through display, as is illustrated in FIG. 1, the delta representation of edges is displayed as an overlay onto the real-world scene 101 as seen by the user 102 viewing the display 113. Alternatively, if the display is an opaque, non-see-through display, the MR device 100 is further operative to display the visible-range representation of the real-world scene 101, which is captured by the visible-range sensor 111, on the display 113. In other words, the delta representation of edges is displayed as an overlay onto the visible-range representation of the real-world scene 101. This means that both the visible-range representation of the real-world scene 101, which represents what the user 102 can see relying on his/her human vision, and the delta representation of edges, which contains the edges of the objects 104 which the user 102 cannot see, are displayed. Preferably, the visible-range representation of the real-world scene 101 is captured by a conventional, visible-light digital camera 111, to provide a substantially undistorted view of the real-world scene 101 to the user 102, similar to what the user 102 would experience while viewing the real-world scene 101 through a see-through display 113.

An example visualization 240 of what the user 102 can see when viewing the display 113 is shown in FIG. 2. The visualization 240 shows the delta representation of edges (visualization 230) overlaid onto the view of the real-world scene 101 as seen by the user 102, if the display 113 is a see-through display. Alternatively, if the display 113 is an opaque, non-see-through display, the visualization 240 shows the delta representation of edges (visualization 230) overlaid onto the visible-range representation of the real-world scene 101 (visualization 210) which represents "what the user can see". As is illustrated in FIG. 2, the delta representation of edges (visualization 230), which contains the edges of the objects 104 which the user 102 cannot see, may be displayed so as to emphasize and/or highlight the edges of the objects 104 which the user 102 cannot see, e.g., by displaying the edges as lines with increased thickness. As an alternative, the delta representation of edges (visualiza-
tion 230) may be displayed as lines of a different color.

Advantageously, by augmenting the human vision of the
user 102 using the MR device 100 to view the real-world
scene 101 only with edges of objects which are not visible
to the user 102, owing to limitation of human vision, e.g.,
because some of the objects 104 or parts thereof are
obscured by smoke 103, a more natural view of the real-
world scene 101 as seen by the user 102 is achieved. In
particular, this is the case if the display 113 is a see-through
display through which the user 102 can view the real-world
scene 101 relying on his/her human vision, which oftentimes
is superior to digitally generated content. By only overlaying
edges of the objects 104 which are not (human-)visible, the
amount of digitally generated, or virtual, content is kept at minimum.

In the following, embodiments of the processing circuitry
120 which is comprised in the MR device 100 are described
with reference to FIG. 3.

The processing circuitry 120 may comprise one or more processors 121, such as Central Processing Units (CPUs),
microprocessors, application processors, application-spe-
cific processors, Graphics Processing Units (GPUs), and
Digital Signal Processors (DSPs) including image proces-
sors, or a combination thereof, and a memory 122 comprising a computer program 123 comprising instructions. When
executed by the processor(s) 121, the instructions cause the
MR device 100 to become operative in accordance with
embodiments of the invention described herein. The
memory 122 may, e.g., be a Random-Access Memory
(RAM), a Read-Only Memory (ROM), a Flash memory, or
the like. The computer program 123 may be downloaded to
the memory 122 by means of a network interface circuitry
115 which may be comprised in the MR device 100 (not
shown in FIG. 1), as a data carrier signal carrying the
computer program 123. The processing circuitry 120 may
alternatively or additionally comprise one or more Applica-
tion-Specific Integrated Circuits (ASICs), Field-Program-
mable Gate Arrays (FPGAs), or the like, which are operative
to cause the MR device 100 to become operative in accordance with embodiments of the invention described herein.

The network interface circuitry 115 may comprise one or
more of a cellular modem (e.g., GSM, UMTS, LTE, 5G, or
higher generation, including communications solutions
dedicated for first responders, emergency personnel, military, law enforcement, etc), a WLAN/Wi-Fi modem, a
Bluetooth modem, an Ethernet interface, an optical inter-
face, or the like, for exchanging data between the MR device
100 and other MR devices, an application server, the Inter-
net, etc.

Figure 4:
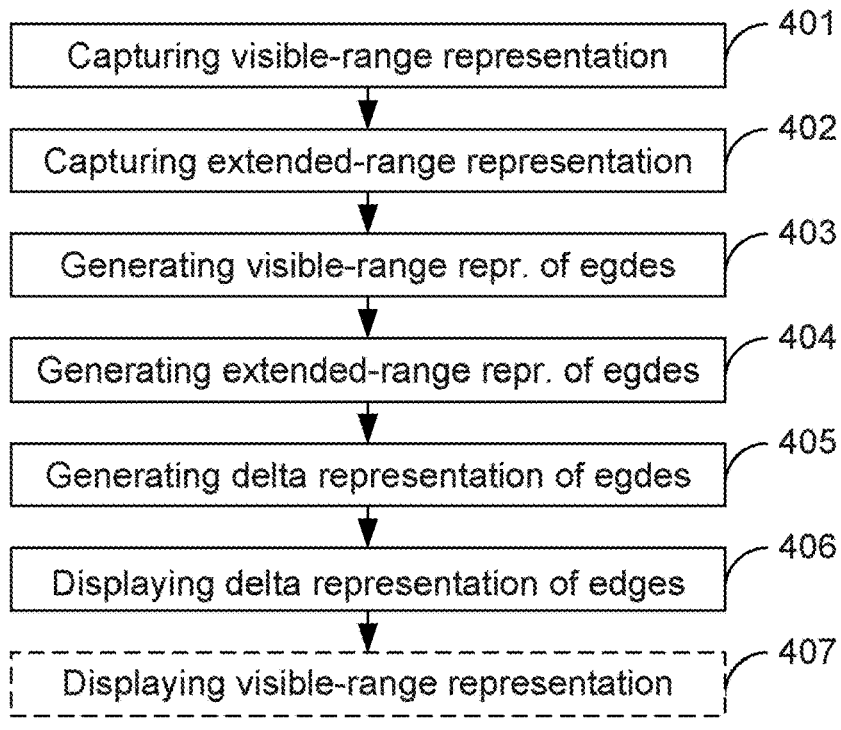
FIG. 4 shows a flow chart illustrating the method of augmenting human vision in limited-visibility environments, in accordance with embodiments of the invention.

In the following, embodiments of the method 400 of
augmenting human vision in limited-visibility environments
are described with reference to FIG. 4.

The method 400 is performed by an MR device 100 and
comprises capturing 401 a visible-range representation of a
real-world scene 101 surrounding the MR device 100 with
a range commensurate with human vision. The visible-range
representation of a real-world scene 101 is captured using a
visible-range sensor 111 comprised in the MR device 100.
The visible-range representation of the real-world scene 101 may, e.g., be captured using wavelengths within the visible
range. The visible-range sensor 111 may, e.g., be a digital
camera.

The method 400 further comprises capturing 402 an
extended-range representation of the real-world scene 101 with an extended range wider than the range commensurate
with human vision. The extended-range representation of the real-world scene 101 is captured using a an extended-
range sensor 112 comprised in the MR device 100. The
extended-range representation of the real-world scene 101
may, e.g., be captured using wavelengths at least partly
outside the visible range. For example, the extended-range
representation of the real-world scene 101 may be captured
using infrared light. The extended-range sensor 112 may,
e.g., be a digital camera. Alternatively, the extended-range
sensor 112 may, e.g., be a Lidar or a radar sensor.

The method 400 further comprises generating 403 a
visible-range representation of edges of one or more physi-
cal objects 104 present in the real-world scene 101. The
visible-range representation of edges of the one or more
physical objects 104 is generated by extracting edges from
the visible-range representation captured by the visible-
range sensor 111.

The method 400 further comprises generating 404 an
extended-range representation of edges of the one or more
physical objects 104. The extended-range representation of
edges of the one or more physical objects 104 may be
generated by extracting edges from the extended-range
representation captured by the extended-range sensor 112.

The method 400 further comprises generating 405 a delta
representation of edges of the one or more physical objects
104. The delta representation of edges comprises edges
which are present in the extended-range representation of
edges but absent in the visible-range representation of edges.
The delta representation of edges of the one or more physical
objects 104 may, e.g., be generated 405 by subtracting the
visible-range representation of edges from the extended-
range representation of edges.

The method 400 further comprises displaying 406 the
delta representation of edges on a display 113 comprised in
the MR device 100. The display 113 may be a see-through
display, and the delta representation of edges may be dis-
played 406 as an overlay onto the real-world scene 101 as
seen by a user 102 viewing the display 113. Alternatively,
the display 113 may be an opaque display (i.e., a non-see-
through display), and the method 400 may further comprise
displaying 407 the visible-range representation of the real-
world scene 101 on the display 113.

It will be appreciated that the method 400 comprise
additional, alternative, or modified, steps in accordance with
what is described throughout this disclosure.

An embodiment of the method 400 may be implemented
as the computer program 123 comprising instructions which,
when the computer program 113 is executed by a computing
device, such as the MR device 100, cause the MR device 100
to carry out the method 400 and become operative in
accordance with embodiments of the invention described
herein. The computer program 123 may be stored in a
computer-readable data carrier, such as the memory 122.
Alternatively, the computer program 123 may be carried by
a data carrier signal, e.g., downloaded to the memory 122 via
the network interface circuitry 115.

The person skilled in the art realizes that the invention by
no means is limited to the embodiments described above. On
the contrary, many modifications and variations are possible
within the scope of the appended claims.

The invention claimed is:

1. A Mixed-Reality, MR, device, for augmenting human
vision in limited-visibility environments, the MR device
comprising:
    a visible-range sensor for capturing a visible-range rep-
        resentation of a real-world scene surrounding the MR
        device with a range commensurate with human vision, an extended-range sensor for capturing an extended-range representation of the real-world scene with an extended range wider than the range commensurate with human vision, a display, and processing circuitry causing the MR device to be operative to:

generate a visible-range representation of edges of one or more physical objects present in the real-world scene by extracting edges from the visible-range representation captured by the visible-range sensor, generate an extended-range representation of edges of the one or more physical objects by extracting edges from the extended-range representation captured by the extended-range sensor, generate a delta representation of edges of the one or more physical objects, comprising edges present in the extended-range representation of edges but absent in the visible-range representation of edges, and display the delta representation of edges on the display.

2. The MR device according to claim 1, operative to generate the delta representation of edges of the one or more physical objects by subtracting the visible-range representation of edges from the extended-range representation of edges.

3. The MR device according to claim 1, wherein the display is a see-through display, and the delta representation of edges is displayed as an overlay onto the real-world scene as seen by a user viewing the display.

4. The MR device according to claim 1, wherein the display is an opaque display, and the MR device is further operative to display the visible-range representation of the real-world scene on the display.

5. The MR device according to claim 1, wherein the visible-range sensor is operative to capture the visible-range representation of the real-world scene using wavelengths within the visible range.

6. The MR device according to claim 1, wherein the extended-range sensor is operative to capture the extended-range representation of the real-world scene using wavelengths at least partly outside the visible range.

7. The MR device according to claim 6, wherein the extended-range sensor is an infrared-light sensor.

8. The MR device according to claim 1, wherein at least one of the visible-range sensor and the extended-range sensor is a digital camera.

9. The MR device according to claim 1, wherein the extended-range sensor is a Lidar or a radar sensor.

10. The MR device according to claim 1, being any one of: a hand-held device, a Head-Mounted Device, HMD, and a helmet-mounted device.

11. A method of augmenting human vision in limited-visibility environments, the method being performed by a Mixed-Reality, MR, device and comprising:

capturing a visible-range representation of a real-world scene surrounding the MR device with a range commensurate with human vision, using a visible-range sensor comprised in the MR device, capturing an extended-range representation of the real-world scene with an extended range wider than the range commensurate with human vision, using a an extended-range sensor comprised in the MR device, generating a visible-range representation of edges of one or more physical objects present in the real-world scene by extracting edges from the visible-range representation captured by the visible-range sensor, generating an extended-range representation of edges of the one or more physical objects by extracting edges from the extended-range representation captured by the extended-range sensor, generating a delta representation of edges of the one or more physical objects, comprising edges present in the extended-range representation of edges but absent in the visible-range representation of edges, and displaying the delta representation of edges on a display comprised in the MR device.

12. The method according to claim 11, wherein the delta representation of edges of the one or more physical objects is generated by subtracting the visible-range representation of edges from the extended-range representation of edges.

13. The method according to claim 11, wherein the display is a see-through display, and the delta representation of edges is displayed as an overlay onto the real-world scene as seen by a user viewing the display.

14. The method according to claim 11, wherein the display is an opaque display, and the method further comprises displaying the visible-range representation of the real-world scene on the display.

15. The method according to claim 11, wherein the visible-range representation of the real-world scene is captured using wavelengths within the visible range.

16. The method according to claim 11, wherein the extended-range representation of the real-world scene is captured using wavelengths at least partly outside the visible range.

17. The method according to claim 16, wherein the extended-range representation of the real-world scene is captured using infrared light.

18. The method according to claim 11, wherein at least one of the visible-range sensor and the extended-range sensor is a digital camera.

19. The method according to claim 11, wherein the extended-range sensor is a Lidar or a radar sensor.

20. A non-transitory computer-readable medium storing a computer program comprising instructions which, when the computer program is executed by a Mixed-Reality, MR, device, causes the MR device to carry out the method according to claim 11.

\* \* \* \* \*